(No Model.)

G. D. ZIMMERMAN.
Swinging Gate.

No. 239,292. Patented March 22, 1881.

Witnesses.
Robert Everett.
J. M. Yznaga.

Inventor.
George D. Zimmerman
by Heylmun & Kane
Attorneys.

UNITED STATES PATENT OFFICE.

GEORGE D. ZIMMERMAN, OF LEBANON, PENNSYLVANIA.

SWINGING GATE.

SPECIFICATION forming part of Letters Patent No. 239,292, dated March 22, 1881.

Application filed December 20, 1880. (No model.)

*To all whom it may concern:*

Be it known that I, GEORGE D. ZIMMERMAN, a citizen of the United States, residing at Lebanon, in the county of Lebanon and State of Pennsylvania, have invented certain new and useful Improvements in Gates; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
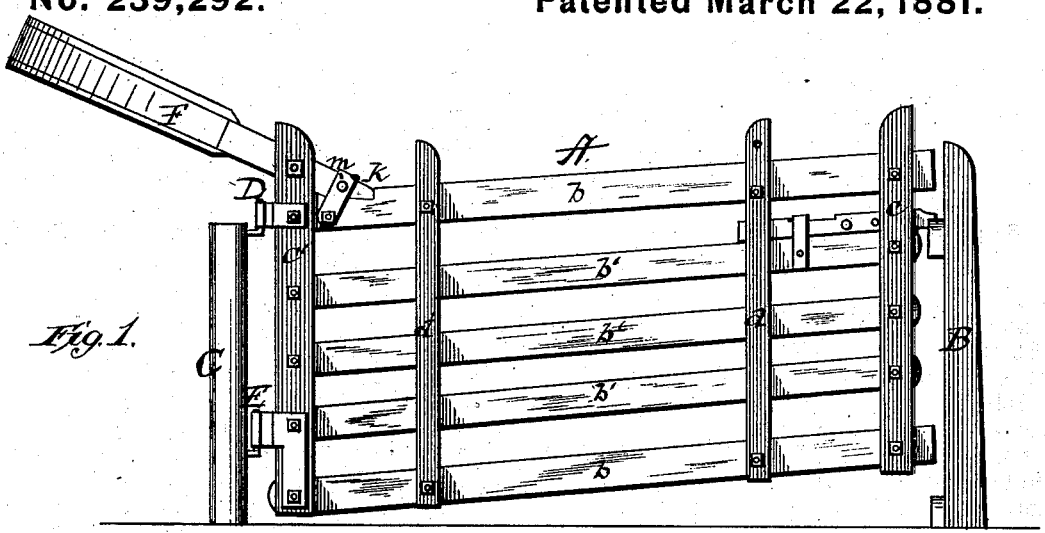
Figure 2:
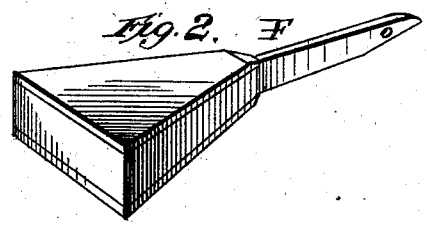
Figure 3:
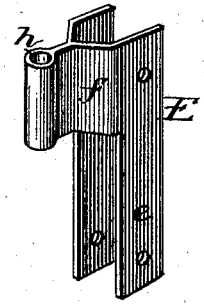

Figure 1 is a side view of the gate, partially raised. Fig. 2 is a perspective view of the weighted lever. Fig. 3 is a perspective view of the lower gate-hinge.

This invention relates to farm-gates of the class known as "swinging gates;" and the main object of the improvement is to construct a gate that will not swag or drag at its latch end in being opened and swung around.

My invention consists in the novel construction and combination of parts, as will be hereinafter set forth and specifically claimed.

In the annexed drawings, forming a part of this specification, the letter A represents a gate composed of a number of horizontal bars, $b$ $b'$. Each bar is bolted to the end vertical bars, $c$ $c'$, so as to work loosely on the bolts and assume an inclination, substantially as shown in Fig. 1 of the drawings. The intermediate vertical bars, $d$ $d'$, bolted to the upper and lower horizontal bars, are designed to strengthen the gate, and they should also work loosely on the bolts. These horizontal and vertical bars are made in width and thickness according to the strength and size of the gate desired.

The letter B represents the front or catch post, and C the rear or hinge post. The latter is termed in this specification a "low hinge-post," because it is lower than the catch-post, and below the horizontal plane of the extended counterbalance-lever, as seen in the drawings. The hinge-post is provided with two hooks of the usual construction, upon which the gate hangs at one end.

To the vertical bar $c'$, at the rear end of the gate, are attached the hinges D and E, near the top and bottom of the said bar, so as to register with the hooks and hang the gate at a proper distance from the ground. The lower hinge, E, (see Fig. 3,) consists of the long side cheeks, $e$, the branch or connecting arm $f$, and the socket or eye $h$, all united in one piece and formed of malleable or cast iron. This lower hinge, having the appearance of an inverted L, has the side cheeks extended below the connecting-arm, so as to secure a bracing action upon the lower corner of the gate, and, being arranged on opposite sides, clasps the rear end of the gate on both sides, strengthens it, supports the strain upon the gate when open and being swung, and enables it to be opened either way, outwardly or inwardly.

The upper surface of the rear end of the upper horizontal bar, $b$, is notched at $k$, and provided with a diagonal clamp-strap, $m$. The object of this notch $k$ is to provide a firm seat for the forward end of the lever F, and to prevent a forward displacement of the same, and the strap $m$, with its bolts, is to confine and secure the forward end of the lever to the seat of the upper horizontal bar, $b$, of the gate, and prevent a backward or upward displacement of the weighted lever.

The letter F (see Fig. 2) represents a counterbalance lever or bar, having at its outer end a box or receptacle to receive and hold stones or other weights. The front beveled end of this bar fits, as before stated, into the notch $k$ of the bar $b$ and under the clamp-strap $m$, and is secured in position by bolts, substantially as seen in Fig. 1 of the drawings. Thus it will be seen, by reference to Fig. 1 of the drawings, that a portion of the lever or bar projects over and beyond the hinge-post in the direction of the fence, and serves to counterbalance, or nearly so, the weight of the gate, so that it will swing to either side without dragging on the ground.

The weighted-box lever attached to the gate, as shown in Fig. 1, is to more easily raise and balance the forward portion of the gate in stormy or winter seasons.

The gate and front post are provided with a latch and locking device for securing the gate when closed.

What I claim as my invention, and desire to secure by Letters Patent, is—

A swinging gate having the rear vertical bar, $c'$, provided with a bolt-hole at its upper end, the notch $k$ in the top horizontal bar, $b$, and the stirrup $m$, in combination with the counterbalance-lever F, as described, and for the purpose set forth.

In testimony whereof I affix my signature in presence of two witnesses.

GEORGE D. ZIMMERMAN.

Witnesses:
 LEWIS REHR,
 BASSLER BOYER.